United States Patent
Fisher et al.

(10) Patent No.: US 12,051,098 B2
(45) Date of Patent: Jul. 30, 2024

(54) COMPUTING SYSTEM AND METHOD FOR ACCOMPLISHING A TRANSACTION THROUGH A PROXY SYSTEM

(71) Applicants: Justin Fisher, Delray Beach, FL (US); Maxwell Sanchez, Delray Beach, FL (US)

(72) Inventors: Justin Fisher, Delray Beach, FL (US); Maxwell Sanchez, Delray Beach, FL (US)

( * ) Notice: Subject to any disclaimer, the term of this patent is extended or adjusted under 35 U.S.C. 154(b) by 39 days.

(21) Appl. No.: 17/531,223

(22) Filed: Nov. 19, 2021

(65) Prior Publication Data

US 2022/0164855 A1 May 26, 2022

Related U.S. Application Data

(60) Provisional application No. 63/127,406, filed on Dec. 18, 2020, provisional application No. 63/116,505, filed on Nov. 20, 2020.

(51) Int. Cl.
*G06Q 30/00* (2023.01)
*G06Q 10/083* (2023.01)
*G06Q 30/0601* (2023.01)

(52) U.S. Cl.
CPC ....... *G06Q 30/0631* (2013.01); *G06Q 10/083* (2013.01); *G06Q 30/0603* (2013.01); *G06Q 30/0613* (2013.01)

(58) Field of Classification Search
CPC ............. G06Q 30/0631; G06Q 10/083; G06Q 30/0603; G06Q 30/0613
USPC ................................ 705/26.1–27.2
See application file for complete search history.

(56) References Cited

U.S. PATENT DOCUMENTS

| 2008/0033834 A1* | 2/2008 | Tarvydas | G06Q 30/0617 705/26.81 |
| 2009/0043674 A1* | 2/2009 | Minsky | G06Q 30/0603 715/765 |
| 2014/0250425 A1* | 9/2014 | Kumar | G06F 11/3072 717/121 |

OTHER PUBLICATIONS

R. Fasuga, P. Stoklasa and M. Němec, "An intelligent tool for all-to-all sales on the Internet: Platform for compilation of commercial offers and requests for companies and customers," 12th International Joint Conference on e-Business and Telecommunications (ICETE), Colmar, France, 2015, pp. 263-270 (Year: 2015).*

* cited by examiner

*Primary Examiner* — Anand Loharikar
(74) *Attorney, Agent, or Firm* — Rimon PC; Marc S. Kaufman

(57) ABSTRACT

A distributed computing system for accomplishing a transaction through a proxy system includes a product database, a supplier database, a supplier-product mapping database and a customer profile database. A client module including a client-side component is configured to execute on a client device associated with at least one of the customers, the client module including a browsing observation service module configured to recognize an item of interest based on content being displayed on the client device and correlate a unique item identifier with the item of interest based on queries to the databases and a browsing augmentation service module configured to present an additional user interface on the client device, which augments a user interface of the supplier content and permits purchase of the item of interest from one of the suppliers.

11 Claims, 6 Drawing Sheets

COMPUTING SYSTEM AND METHOD FOR ACCOMPLISHING A TRANSACTION THROUGH A PROXY SYSTEM

BACKGROUND

In recent years, the exchange of information over the internet has exploded. Virtually any type of information can be gathered through web searching and browsing. Typically, a user on a client computing device executing a web browser can view and interact with web servers and access pages of information on web sites. However, each web site can, of course, select and/or restrict the information to be presented by the web site. In other words, as in all client server computing architectures, information on the web is "server-centric." Therefore, to gather full and accurate information, it is often necessary for a user to access many web sites individually and manually collate information. Search engines, such as GOOGLE™, and other aggregation tools help to locate web sites with relevant information. However, the information is still server-centric. The browser is merely a tool for interacting with the web sites, i.e. servers.

As just one example, it has become common to purchase various goods and services online through a client-side web browser interacting over the internet with a vendor server. In fact, practically every supplier of goods and services (collectively referred to as "items" herein) now provides a mechanism for purchasing their items online. This includes large vendors, such as WALMART™, and smaller/local shops and restaurants. Initially, a potential customer had to browse each individual web site of various vendors to compare products, pricing, shipping times and the like.

U.S. Pat. No. 6,714,933 discloses a method of aggregating product information from a plurality of sources in a networked computer environment by crawling the plurality of sources and gathering product phrase information from each of the plurality of sources via the crawler. The Aggregated information is used to present a unified catalog, showing items from many vendors, to a user.

More recently, various online "marketplace" web sites, such as AMAZON.COM™, EBAY™, and SHOPIFY™ have become popular. These marketplaces allow users to browse, select, and purchase items from multiple sources in a single website in a relatively seamless manner. The rise of online marketplaces has, in the view of many, improved the online shopping experience significantly by reducing the need browse multiple different web sites for comparison shopping. However, the marketplaces generally require that the vendor pay a fee for participation in the marketplace web site, such as a portion of the sale price for each item. Further the marketplace has control over the presentation of items, such as item placement, information content and the like. The result is that marketplaces do not always provide the best purchase options for the customer and do not always provide the customer with the information required to make an informed purchase. For example, only selected vendors will participate in the marketplace. Further, a purchaser may be interested in the characteristics of the vendor such as, veteran-owned status, corporate structure, size, diversity, charity, level of philanthropy and the like. Information relating to many factors that are important to online information customers is still not readily available in the appropriate context.

SUMMARY

A first aspect of the disclosure relates to a distributed computing system for accomplishing a transaction through a proxy system, the system comprising: a product database, stored on a computing device and including multiple product records, each product record corresponding to one of plural items and including a unique product identifier that is machine-readable, a human-readable product name, and item attribute data indicating characteristics of a corresponding item; a supplier database, stored on a computing device and including multiple supplier records, each supplier record corresponding to one of plural item suppliers and including a machine-readable unique item supplier identifier, a human-readable item supplier name and item supplier attributes indicating characteristics of a corresponding item supplier; a supplier-product mapping database, stored on a computing device and including multiple mapping records, each mapping record corresponding to one of the unique item identifiers and including an item supplier product profile specifying at least one version of one of the items and at least one of the suppliers who is able to supply the at least one version of the item; a customer profile database, stored on a computing device and including plural customer profile records, each customer profile record corresponding to a customer and including a unique customer identifier, a delivery address corresponding to the unique customer, payment information corresponding to the unique customer and contact information corresponding to the unique customer; a supplier query module configured to query the supplier-product mapping database to thereby determine at least one supplier of the item; a product query module configured to query the product database to thereby determine attributes of the item of interest; a client module including a client-side component configured to execute on a client device associated with at least one of the customers, the client module including a browsing observation service module configured to recognize an item of interest to a corresponding customer based on content being displayed on the client device and correlate a unique item identifier with the item of interest, and a browsing augmentation service module configured to present an additional user interface on the client device, which augments a user interface of the content, when the client device is viewing the content, the additional user interface including at least one attribute of the item of interest returned from the product database and at least one supplier of the item of interest returned from the supplier-product mapping database, the user interface including a purchase selection element; and a proxy purchase service module configured to execute a purchase function for the item of interest from the at least one item supplier in response to a user selection of the purchase element and in accordance with a record corresponding the customer in the customer profile database.

A second aspect of the disclosure relates to a method for accomplishing a transaction over a distributed computing system using a proxy system, the proxy system including a product database, stored on a computing device and including multiple product records, each product record corresponding to one of plural items and including a unique product identifier that is machine-readable, a human-readable product name, and item attribute data indicating characteristics of a corresponding item; a supplier database, stored on a computing device and including multiple supplier records, each supplier record corresponding to one of plural item suppliers and including a machine-readable unique item supplier identifier, a human-readable item supplier name and item supplier attributes indicating characteristics of a corresponding item supplier; a supplier-product mapping database, stored on a computing device and including multiple mapping records, each mapping record corresponding to one of the unique item identifiers and including an item supplier product profile specifying at least one version of one of the items and at least one of the suppliers who is able to supply the at least one version of the item; a customer profile database, stored on a computing device and including plural customer profile records, each customer profile record corresponding to a customer and including a unique customer identifier, a delivery address corresponding to the unique customer, payment information corresponding to the unique customer and contact information corresponding to the unique customer; the method comprising: querying the supplier-product mapping database to thereby determine at least one supplier of the item; querying the product database to thereby determine attributes of the item of interest; executing, on a client device associated with at least one of the customers, a client module including a client-side component, the executing including recognizing an item of interest to a corresponding customer based on content being displayed on the client device and correlating a unique item identifier with the item of interest and presenting an additional user interface on the client device, which augments a user interface of the content, when the client device is viewing the content, the additional user interface including at least one attribute of the item of interest returned from the product database and at least one supplier of the item of interest returned from the supplier-product mapping database, the user interface including a purchase selection element; and executing a proxy purchase function for the item of interest from the at least one item supplier in response to a user selection of the purchase element and in accordance with a record corresponding the customer in the customer profile database.

A third aspect of the disclosure relates to computer-readable media having non-transitory instructions recorded thereon for accomplishing a transaction over a distributed computing system using a proxy system, the proxy system including a product database, stored on a computing device and including multiple product records, each product record corresponding to one of plural items and including a unique product identifier that is machine-readable, a human-readable product name, and item attribute data indicating characteristics of a corresponding item; a supplier database, stored on a computing device and including multiple supplier records, each supplier record corresponding to one of plural item suppliers and including a machine-readable uniq10. A method for accomplishing a transaction over a distributed computing system using a proxy system, the proxy system including a product database, stored on a computing device and including multiple product records, each product record corresponding to one of plural items and including a unique product identifier that is machine-readable, a human-readable product name, and item attribute data indicating characteristics of a corresponding item; a supplier database, stored on a computing device and including multiple supplier records, each supplier record corresponding to one of plural item suppliers and including a machine-readable unique item supplier identifier, a human-readable item supplier name and item supplier attributes indicating characteristics of a corresponding item supplier; a supplier-product mapping database, stored on a computing device and including multiple mapping records, each mapping record corresponding to one of the unique item identifiers and including an item supplier product profile specifying at least one version of one of the items and at least one of the suppliers who is able to supply the at least one version of the item; a customer profile database, stored on a computing device and including plural customer profile records, each customer profile record corresponding to a customer and including a unique customer identifier, a delivery address corresponding to the unique customer, payment information corresponding to the unique customer and contact information corresponding to the unique customer; the method comprising: querying the supplier-product mapping database to thereby determine at least one supplier of the item; querying the product database to thereby determine attributes of the item of interest; executing, on a client device associated with at least one of the customers, a client module including a client-side component, the executing including recognizing an item of interest to a corresponding customer based on content being displayed on the client device and correlating a unique item identifier with the item of interest and presenting an additional user interface on the client device, which augments a user interface of the content, when the client device is viewing the content, the additional user interface including at least one attribute of the item of interest returned from the product database and at least one supplier of the item of interest returned from the supplier-product mapping database, the user interface including a purchase selection element; and executing a proxy purchase function for the item of interest from the at least one item supplier in response to a user selection of the purchase element and in accordance with a record corresponding the customer in the customer profile database.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown.

DETAILED DESCRIPTION

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import.

Disclosed implementations include a novel data model, multiple computing devices cooperating in a networked environment, including databases storing novel data structures, and enhancing data by gathering and processing data from distributed computing devices. Implementations also include methods for accomplishing a transaction using a proxy system to thereby provide enhanced and more efficient transactions in a networked computing environment. The databases can be of any format and/or protocol. For example, SQL databases can be used. The term "database", as used herein, can refer to either a collection of data structures and/or the executable logic for processing, storing, and retrieving data from the collection of data structures.

Figure 1:
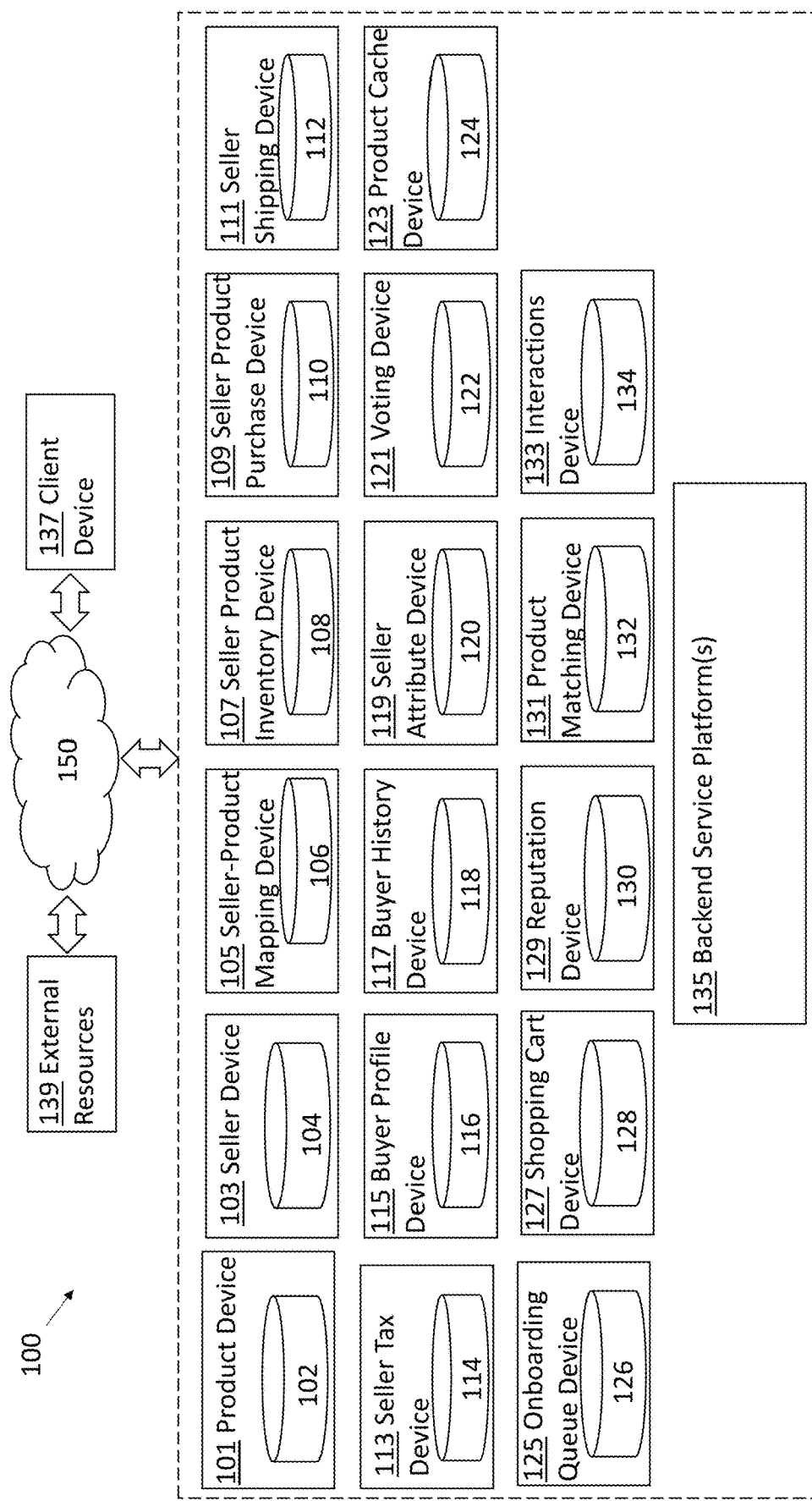
FIG. 1 is a schematic diagram of a computing system for proxy transactions in accordance with disclosed implementations.

FIG. 1 illustrates a distributed networked computing system in accordance with disclosed implementations. As illustrated in FIG. 1, computing system 100 includes multiple computing devices, and corresponding databases networked through communications network 150, such as a Local Area Network (LAN) and/or the Internet. Of course, network 150 is illustrated schematically and can include any type of communications technology, such as wireless 4G or 5G, Ethernet, Near Field communications (NFC), WiFi, Bluetooth, or the like, as described in more detail below. The various devices can also include software executed on a computer hardware processor, as described in more detail below. The phrase "software module" or "module" as used herein refers to one or more portions of executable code executed by a computer hardware processor to accomplish one or more specified functions, which functions are referred to as a "service" herein. Each device can include one or more software modules configured to accomplish the functions attributed to the device.

While the devices are shown as each having a single database for clarity, the various devices, databases, and software modules can be combined or further segregated as will be apparent to one of skill in the art of distributed computing systems and database technology. Computing system 100 is described using the example of a platform for selling physical products to users/customers. However, the invention can be adapted to provide any type of transaction for any product, service, or information (collectively referred to as "items" herein).

As noted above, disclosed implementations utilize a novel data model that provides more efficient transactions over a computing network. Therefore, an overview of the computing system and corresponding databases will be discussed with respect to FIG. 1. More detail of a data model and data aggregations and enhancement as well as interoperation of the devices in accordance with disclosed implementations is discussed in greater detail below with respect to the additional FIGURES.

Product device 101 includes product database 102 containing one entry per product sold through the platform. Note that a "product" can encompass many potential configurations of the product. For example, a particular shirt may have a unique Uniform Product Code (UPC) and many different product options that various sellers associate with the product (such as different colors or sizes). Entries (i.e. database records) in product database 102 contain at least one human-readable identifier e.g. a product name) and at least one machine-readable identification code (such as a UPC, SKU, a brand specific product identifier, or another identifier). One of these machine-readable identification codes will be unique between all entries in the product database (referred to as the "Unique Product Identifier", or "UPI" herein) and will be used to reference products in the platform. The entries may contain additional fields, including but not limited to, additional machine-readable identification codes, one or more human-readable product descriptions, one or more URLs or other references to product media (photos, videos, or other information relevant to the product), and information relating to brand, manufacturer, MSRP, weight, size, color, style, and country of origin.

As noted above, the platform identifies each item, for example a product (not variants of a product such as different size or color, but a product itself) using a unique identifier, the Unique Product Identifier (UPI). However, the UPI is a number assigned by backend service device 135 of the platform. As a result, a service needs to be able to convert another representation of a product (such as a seller-specific identification code like an ASIN, or a standardized identifier such as a UPC code) to a UPI in order to lookup the product in the platform. A UPI mapping service of backend service device 135 provides this functionality by enabling lookups of other identifiers to map to a UPI. This functionality is described in greater detail below.

Seller device 103 includes seller database 104 containing one entry per seller that participates in the platform. Entries in seller database 104 contain at least one human-readable seller name, and at least one machine-readable seller identification code. One of these machine-readable seller identification codes will be unique between all entries in the seller database (referred to as the "Unique Seller Identifier", or "USI" herein) and will be used to reference the seller in the platform. The entries may also contain additional fields including, but not limited to, additional machine-readable identification codes, one or more human-readable seller descriptions, one or more URLs or other references to the seller's online presence (e.g. a seller website address), seller physical location(s), seller tax information, seller business registration information, and/or seller attributes (e.g. "Veteran-Owned," "Non-Profit," "Minority-Owned, and the like).

Seller-product mapping device 105 includes seller-product mapping database 106 containing one entry per UPI and one or more seller product profiles, each of which represent one or more versions of a particular product and a seller who sells the one or more product versions with a corresponding pricing function. The pricing function can be any value(s), algorithm, link and/or other referencing/pointing mechanism to pricing information and/or other information from which a price for the associated product version can be derived.

Seller product inventory device 107 includes seller product inventory database 108 containing one entry per unique combination of the triple <UPI, USI, and product version> and associating each triple with the current (known) inventory of the seller for that particular product version. A seller inventory query function, which can be used to query the seller for updated inventory for a particular supported product version, can be stored as a software module on seller product inventory device or another device in the manner described below. Seller product purchase device 109 includes seller product purchase database 110 containing one entry per USI which maps the USI to a seller purchase function module which can be used to execute a purchase from the seller identified by the USI in the manner described below.

Seller shipping device 111 includes seller shipping database 112 containing one entry per USI corresponding to a shipping function which responds with an order shipping response containing one or more shipping options available from the seller for each USI. Multiple shipping options for a seller can be product-specific by being associated with a UPI or other product indicator. For example, 2-day shipment might be available for in-stock and/or smaller items but not for other items.

Seller tax device 113 includes seller tax database 114 containing one entry per UPI corresponding to a tax function which responds with an order tax response indicating the total amount of tax which would be charged on a particular order.

Buyer profile device 115 includes buyer profile database 116 containing one entry per Unique Buyer Identifier (UBI), one or more shipping physical addresses, one or more stored payment methods (credit card information for example), one or more email addresses of the buyer, buyer's first/middle/last name and a buyer password hash to be used for authentication of the buyer (such as by receiving a password during a login and comparing the stored password hash to a hash of the entered password).

Buyer history device 117 includes buyer history database 118 containing entries which each include a UBI and a seller attribute device 119 includes seller attribute database 120 containing entries which each contain one USI and one or more seller attributes. Each seller attribute represents a particular attribute which describes the corresponding seller (for example, for filtering reasons, such as "Veteran-Owned"). This data can be a reorganized version of data already available in seller database 104 and could be merged with seller database 104.

Voting device 121 can include voting database 122 containing one entry per UPI, and a total number of votes that users of the platform have voted for this item to be onboarded into the platform. Voting database 122 can include the results of any voting or poll, such as seller ratings, buyer rating or the like and voting device 121 can include the modules necessary for accomplishing the voting and/or poll. For example, voting database 121 can include one entry per UBI and a single UPI and can record all votes. Other examples include voting database 122 including records covering multiple entries for the same UBI to different UPIs, and the same UPI associated with multiple UBIs.

Product cache device 123 includes product cache database 124 containing entries with a string product name, a USI, a URL linking to the product page where the corresponding product was found to be sold by the seller indicated by the USI, a string type of store (for automatic interaction purposes), and additional information available about the product (such as price information). Onboarding queue device 125 includes onboarding queue database 126 containing entries with a similar format to that of product cache database, with the addition of a UPI to provide a queue for products which have been found on other sites, but which have not been onboarded yet (described in greater detail below). Product cache database 124 and onboarding queue databased 126 can be readily integrated into a single database, for example by adding a flag indicating whether or not an entry is associated with an onboarded product or not.

Shopping cart device 127 includes shopping cart database 128 containing one entry per unique "shopping cart" ID which stores data for all of the items associated with the shopping cart as described in greater detail below. Reputation device 129 includes reputation database 130 containing entries which represent reputation-modifying events for users. For example, slow payment, returns, complaints and the like can be recorded in the reputation database.

Product matching device 131 can include product matching database 132 containing one unique entry per "product to find", e.g. a product in a user search query and mapping the product to find to product entries found in product database 102. Product matching database 132 can also map a product to find to one or more product verify responses. Product matching database 132 can also map products to find to a "product found" entry.

Website interactions device 133 includes website interactions database 134 containing one unique entry per URL from which the platform intends to collect interaction information, as described in greater detail below. The URLs can be mapped to one or more interaction processes, such as APIs, classes, forms, query formats, or interaction processes based on particular interactions (such as clicking a button or typing in a text box) with a rendered format of the website) used by the web site or interaction processes based on particular interactions (such as clicking a button or typing in a text box) with a rendered format of the website).

Backend service device 135 includes one or more servers that provide various services that are described in greater detail below. Client device 137 is associated with a user/purchaser and executes a client module, in the form of a browser plug-in for example, and cooperates with backend service device 135 to execute a proxy transaction in the manner described in greater detail below. Client device 137 can be any computing device under the control of a user as described in greater detail below.

An example of a data model in accordance with a disclosed implementation will now be described in greater detail. When describing the data model, variable names will be expressed in standard programming notation corresponding to the description above. For example, "seller attribute" will be referred to as "SellerAttribute". The table below defines primitive data types used in the example data model.

| Name | Description |
| --- | --- |
| INT16 | A 16-bit signed integer |
| UINT16 | A 16-bit unsigned integer |
| INT32 | A 32-bit signed integer |
| UINT32 | A 32-bit unsigned integer |
| INT64 | A 64-bit signed integer |
| UINT64 | A 64-bit unsigned integer |
| FLOAT16 | A 16-bit float as defined by IEEE 754 |
| FLOAT32 | A 32-bit float as defined by IEEE 754 |
| FLOAT64 | A 64-bit float as defined by IEEE 754 |
| BOOLEAN | A 1-bit value where 0 = false 1 = true |
| String | An array of bytes interpreted as a textual string |

The table below defines extensions to primitive data types used in the data model example.

| Name | Data Type | Description |
| --- | --- | --- |
| NumString | String | A String whose characters (other than a terminating character, if relevant) are numerial (0-9). |
| EmailAddress | String | An email address, formatted as name + "@" + domain. |
| UniqueProductIdentifier (UPI) | UNIT64 | An identifier which identifies products uniquely. The UPI is unique globally within the AirLift system. Note that a UPI is shared by products which are alternate configurations of each other (i.e. a particular shirt will have a unique UPI which corresponds to all possible configurations like color, size, etc.) |
| UniqueSellerIdentifier (USI) | UINT64 | An identifier which identifies sellers uniquely. The USI is unique globally within the AirLift system. |
| UniqueBuyerIdentifier (UBI) | UINT64 | An identifier which identifies a buyer uniquely. The UBI is unique globally within the AirLift system. |
| Currency | String | A currency identifier (ex: USD, EUR, BTC). |
| Pair<A, B> | N/A | A pair containing two potentially different types, which can be any data type (A and B are both replaced with specific types when used). |
| ProductAttribute | Pair<"Name":String, "Values":String[ ]> | A ProductAttribute contains an attribute name (ex: color, style, size, etc.) and one or more attribute value(s) appropriate to the attribute name (ex: red, blue, etc.). Multiple attribute values are used in a ProductAttribute to represent that the ProductAttribute represents multiple configurations (ex: both the product with colors red and blue). |
| Price | Pair<"Amount":UINT32, "Currency":Currency> | The price of a product (expressed in atomic units of the lowest denomination for the provided currency, i.e. cents for USD) in a particular currency. |
| SellerAttribute | String | An attribute/criteria which a seller meets (i.e. "Veteran Owned," "Non-Profit," etc.) |
| URL | String | A "Uniform Resource Locator" as defined by IETF RFC 3986. |

The table below describes data structures used in the example data model.

| Data Structure Name | Field(s) Name | Type | Required | Description |
| --- | --- | --- | --- | --- |
| ProductVersion | Product | UPI | Yes | A particular version of a product (i.e. UPI corresponding to a particular shirt, and attributes "Medium" and "Grey"). |
|  | Price | Price | Yes |  |
|  | Attributes | ProductAttribute[ ] | No |  |
| SellerProductProfile | Product | UPI | Yes | A profile describing the product versions a particular seller provides, and the associated pricing function for any of the included ProductVersions. |
|  | Seller | USI | [0029] Yes |  |
|  | ProductVersions | ProductVersions[ ] | No |  |
|  | PricingFunction | QuantityPricingFunction | Yes |  |
| PhysicalAddress | FirstName | String | Yes | A physical address (used for sending/receiving, billing, etc.) |
|  | MiddleName | String | No |  |
|  | LastName | String | Yes |  |
|  | AddressL1 | String | Yes |  |
|  | AddressL2 | String | No |  |
|  | City | String | Yes |  |

-continued

| Data Structure Name | Field(s) Name | Type | Required | Description |
|---|---|---|---|---|
|  | State/Province | String | Yes |  |
|  | PostalCode | String | Yes |  |
|  | [0030] Country | [0031] String | [0032] Yes |  |
| DeliveryAddress | PhysicalAddress | PhysicalAddress | Oneof | An address (physical or virtual) to deliver goods to. |
|  | VirtualAddress | String |  |  |
| PaymentCard | CardNumber | NumString | Yes | A credit or debit card with accompanying billing address. |
|  | CVV | NumString | Yes |  |
|  | ExpirationMonth | NumString | Yes |  |
|  | ExpirationYear | NumString | Yes |  |
|  | FullName | String | Yes |  |
|  | BillingAddress | PhysicalAddress | Yes |  |
| PaymentCardToken | EmailAddress | String | Yes | A payment card stored as a token for third-party payment providers. |
|  | CardToken | String | Yes |  |
| PaymentMethod | FullCard | PaymentCard | Oneof | A method of payment. |
|  | TokenCard | PaymentCardToken |  |  |
|  | BillingAddress | PhysicalAddress | No |  |
| ProductQuantity | Product | ProductVersion | Yes | A product and associated quantity. |
|  | Quantity | UINT32 | Yes |  |
| ProductOrder | ProductQuantity | ProductQuantity | Yes | An ordered product/amount and corresponding price |
|  | PricePerItem | Price | Yes |  |
| SellerProductOrder | ProductOrder | ProductOrder | Yes | An order (or intention) of a particular product and quantity at a particular price per item from a particular seller with a particular selected shipping option. |
|  | Seller | USI | Yes |  |
|  | ShippingMethod | ShippingOption | Yes |  |
| Order | Buyer | UBI | Yes | An order containing the buyer, products purchased (and not purchased) and from what seller, address delivered to, and payment method used |
|  | StoreResults | StoreOrderResults[ ] | Yes |  |
|  | DeliveryAddress | DeliveryAddress | Yes |  |
|  | PaymentMethod | PaymentMethod | Yes |  |
| DateTime | Hour | INT16 | Yes | A datetime with one-second granularity. |
|  | Minute | INT16 | Yes |  |
|  | Second | INT16 | Yes |  |
|  | Year | INT16 | Yes |  |
|  | Month | INT16 | Yes |  |
|  | Day | INT16 | Yes |  |
|  | Timezone | String | Yes |  |
| ShippingOption | Price | Price | Yes | One shipping option that a user can select with the specified price, carrier, low/high delivery time estimates, and an identifier which can be used to refer to the shipping option, and the products and their respective quantities covered by the ShippingOption, and if used the tracking information. |
|  | DeliveryCarrier | String | Yes |  |
|  | DeliveryTimeLow | DateTime | Yes |  |
|  | DeliveryTimeHigh | DateTime | Yes |  |
|  | ShippingIdentifier | String | Yes |  |
|  | Products | ProductQuantity[ ] | Yes |  |
|  | Tracking | String | No |  |
| OrderShippingInquiry | Seller | USI | Yes | A shipping inquiry object with a list of all ProductVersions and their respective quantities, and the address to ship to |
|  | Products | ProductQuantity[ ] | Yes |  |
|  | ShippingAddress | ShippingAddress | Yes |  |

-continued

| Data Structure Name | Field(s) Name | Type | Required | Description |
|---|---|---|---|---|
| OrderTaxInquiry | Seller<br>Products<br>ShippingAddress | USI<br>ProductQuantity[ ]<br>ShippingAddress | Yes<br>Yes<br>Yes | A tax inquiry object with a list of all ProductVersions and their respective quantities, and the address the items will be shipped to |
| OrderShippingResponse | ShippingOption[ ] | ShippingOptions | Yes | A response to a shipping inquiry for an order, contains all available shipping options |
| OrderTaxResponse | Price | TaxAmount | Yes | A response to a tax inquiry for an order, contains the sum of total taxes that would be due on the order |
| StoreOrderResult | Seller<br>Success<br>SuccessfulItems<br>FailedItems<br>ShippingOptions<br>DeliveryAddress<br>Item Price<br>TaxPrice | USI<br>Boolean<br>ProductOrder[ ]<br>ProductOrder[ ]<br>ShippingOption[ ]<br>DeliveryAddress<br>Price<br>Price | Yes<br>Yes<br>Yes<br>Yes<br>Yes<br>Yes<br>Yes<br>Yes | A order result occurring from attempting an order from a particular store for one or more items. Order result contains whether the order was successful (at least one item successfully purchased), which items were/weren't purchased, what shipping option(s) were used |
| InventoryQueryResponse | UPI<br>Pricing<br>Inventory | UPI<br>QuantityPricingFunction<br>Pair<ProductVersion, UINT32>[ ] | Yes<br>Yes<br>Yes | A response to querying a shop for its inventory containing the associated pricing function and the inventory available for each product version corresponding to the QPI |
| OrderIntention | Buyer<br>Orders<br>Address<br>PaymentMethod | UBI<br>SellerProductOrder[ ]<br>DeliveryAddress<br>PaymentMethod | Yes<br>Yes<br>Yes<br>Yes | An intention to create an order comprised of (potentially) multiple product orders from different sellers with a single delivery address and payment method. |
| ShoppingCartEntry | UPI<br>Version<br>Added<br>UBI | UPI<br>ProductVersion<br>DateTime<br>UBI | Yes<br>Yes<br>No<br>No | An entry in a shopping cart. |
| ShoppingCartId | Identifier<br>Name | UINT64<br>String | Yes<br>No | A unique identifier for a shopping cart |
| ShoppingCart | UBIs<br>Entries<br>Name | UBI[ ]<br>ShoppingCartEntry[ ]<br>String | Yes<br>Yes<br>No | A collection of ShoppingCartEntry(s) which constitute (one of) a user's (or shared amongst several different users) cart(s). |
| CreateCartRequest | UBI<br>Name | UBI[ ]<br>String | Yes<br>No | A request to create a cart for a particular user or users identified by their UBI(s) |

-continued

| Data Structure Name | Field(s) Name | Type | Required | Description |
|---|---|---|---|---|
| CreateCartResponse | Success | Boolean | Yes | A response indicating success or failure for creating a specific cart |
|  | Id | ShoppingCartId | Yes |  |
| AddToCartRequest | Product | ProductQuantity | Yes | A request to add a particular product in the specified quantity to the cart |
|  | CartId | ShoppingCartId | Yes |  |
|  | UBI | UBI | Yes |  |
|  | RequestId | UINT64 | Yes |  |
| AddToCartResponse | Success | Yes | Yes | A response indicating whether adding the item was successful |
|  | CartId | ShoppingCartId | Yes |  |
|  | RequestId | UINT64 | Yes |  |
| RemoveFromCartRequest | Product | ProductQuantity | Yes | A request to remove an item from the cart |
|  | CartId | ShoppingCartId | Yes |  |
|  | UBI | UBI | Yes |  |
|  | RequestId | UINT64 | Yes |  |
| RemoveFromCartResponse | Product | ProductQuantity | Yes | A response indicating whether the item was removed from the cart |
|  | CartId | ShoppingCartId | Yes |  |
|  | UBI | UBI | Yes |  |
|  | RequestId | UINT64 | Yes |  |
| GetCartRequest | CartId | ShoppingCartId | Yes | A request to get a specific cart |
|  | UBI | UBI | Yes |  |
|  | RequestId | UINT64 | Yes |  |
| GetCartReply | Cart | ShoppingCart | Yes | A reply containing (if available) the requested cart |
|  | RequestId | UINT64 | Yes |  |
| Reputation Entry | UBI | UBI | Yes | An entry representing a reputation-modifying event for a user. |
|  | Accuracy | FLOAT32 | Yes |  |
|  | Weight | FLOAT32 | Yes |  |
|  | Time | DateTime | Yes |  |
| ProductToFind | ProductVersion | ProductVersion | Yes | A product (version) along with it's name and a description and optional media and existing known URLs for its purchase |
|  | UPI | UPI | No |  |
|  | ProductName | String | Yes |  |
|  | ProductDesc | String | Yes |  |
|  | Media | URL[ ] | No |  |
|  | Known | URL[ ] | No |  |
|  | UPC | String | No |  |
| ProductFound | URL | URL | Yes | An indication that a user has located a particular product, and that it is associated with the included name/description, and if available multimedia (ex: product images, video). |
|  | ProductVersion | ProductVersion | Yes |  |
|  | Finder | UBI | Yes |  |
|  | ProductName | String | Yes |  |
|  | ProductDesc | String | Yes |  |
|  | Media | URL[ ] | No |  |
|  | UPC | String | No |  |
| ProductVerifyRequest | ProductFound | ProductFound | Yes | A request to verify that a ProductFound matches a ProductToFind |
|  | ProductToFind | ProductToFind | Yes |  |
|  | RequestId | UINT64 | Yes |  |
| ProductVerifyResponse | ProductFound | ProductFound | Yes | A response indicating whether the specified found and to-find products were a match. |
|  | ProductToFind | ProductToFind | Yes |  |
|  | UBI | UBI | Yes |  |
|  | Success | Boolean | Yes |  |
|  | RequestId | UINT64 | Yes |  |
| UIElement | Pattern | String | Yes | A UI Element which a user can interact with identified by a pattern which can be used to match or find the UI Element. |
| UIInteraction | UIElement | UIElement | Yes | An interaction with a UI element (where the interaction is specified by Input, and any pattern that the input adheres to is identified by InputPattern, if applicable. |
|  | Input | String | Yes |  |
|  | InputPattern | String | No |  |
|  | HumanGenerated | Boolean | Yes |  |

-continued

| Data Structure Name | Field(s) | | | |
|---|---|---|---|---|
| | Name | Type | Required | Description |
| InteractionProcess | UIInteractions | UIInteraction[ ] | Yes | A list of UI interactions performed on content loaded from the specified URL. |
| | Source | URL | Yes | |
| BrowseNotification | UBI | UBI | Yes | A notification a client sends to indicate that it is browsing a particular URL. |
| | Source | URL | Yes | |
| InteractionRecordRequest | Source | URL | Yes | A request for a client to record an interaction, and the fields whose interactions are desired to be recorded. |
| | Fields | String[ ] | Yes | |
| | FinalizationFields | String[ ] | Yes | |

The platform enables users to purchase items directly from sellers via proxy purchasing functions. The platform detects product information in content rendered on a user's client device 137, determines product availability from sellers, provides information about the available sellers and products, collects payment from the user, remits payment to the seller, and places an order with the seller corresponding to the products the end-user purchased. The order can be fulfilled through conventional channels. If several different products are purchased in a single order by a user and these products are purchased through different sellers, the platform automatically splits the order into suborders and creates and executes each suborder with the respective seller.

Figure 2:
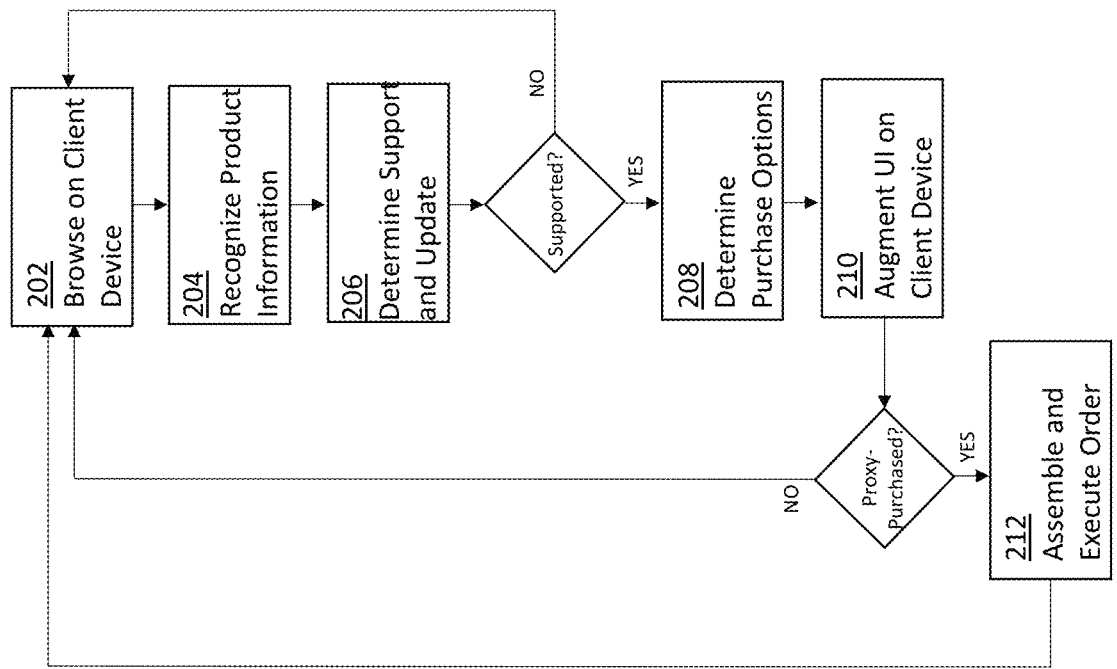
FIG. 2 is a flowchart of a proxy purchase process transactions in accordance with disclosed implementations.

FIG. 2 is a flowchart of an example of a proxy transaction method 200 accomplished by the platform in accordance with disclosed implementations. At step 202, a user browses the internet on client device 137 having the client module installed thereon. During the browsing, content including product information, such as web pages of eCommerce sites with product listings, will be rendered on client device 137. At step 204, the client module of client device 137 will parse the web pages and recognize products. Recognition can be accomplished through UPIs, product names, seller specific codes, and/or other product information rendered on client device 137 while browsing web pages and a browsing observation service, executed at least in part by the client module, can be executed periodically or when triggered by an action such as loading a new web page. The browsing observation service attempts to acquire a partial or complete copy of the content being displayed to the user and/or data related to creating and/or updating the content which the user is consuming, and/or the source of the content and/or data used to create the content. The browsing observation service can access the current in-memory representation of the webpage the user is browsing and look for particular elements that comprise the web page, and view the source URL of the page and look for matches to particular patterns that are possibly related to products (e.g. a browser plugin might know a URL format for an eCommerce site that includes a product identifier, or may find an element on the in-memory version of the webpage which contains a reference to a particular product). The browsing observation service can save any location found in the in-memory view of the webpage containing reference to specific products. As just one example, the web page might include the description "Leviton™ T5633-T 15 Amp Electrical Outlet." The client module can recognize "Leviton™" as a brand name and then apply a brand specific template to recognize that "T5633-T" is a brand specific product code.

If any potential products are found in the content, the process can send an indication of the discovered potential products (by some or all found identifying data including but not limited to name, unique identifier code (like ASIN or UPC), description, image, version/configuration, etc.) and (if available) the source of the content (e.g. a URL or portion(s) thereof), and the location of the product(s), such as references to elements in the in-memory representation of web page. The indication is sent to a browsing augmentation service for display in a user interface on client device 137 as described in greater detail below with respect to step 210 of FIG. 2.

Additionally, the browsing observation service can also send information to backend service platform 135 concerning the products (and if available, associated pricing) available (along with other identifying information, such as the source URL, in the case of a website containing the content) to be used as a mechanism for acquiring potential retailers of given items, as described in greater detail below. In the event that the items returned to backend platform service 135 by the browsing observation service are not recorded in product database 102, new entries with unique UPIs will be created for each item found, with as much associated metadata as can be collected (name/title, options, any machine-readable identification codes, links to any multimedia content associated with the item, etc.).

Additionally, the browsing observation service can detect (by analysis of a URL, analysis of web page content or other displayed content and/or its in-memory representation(s), and/or user interactions) elements and/or patterns that indicate a user is performing a checkout operation on the website, and recording the means by which the user interacts with the checkout experience including but not limited to which fields are filled and how the data in the fields is formatted, which buttons are clicked, which keystrokes are used to navigate the web page, and/or corresponding information available in the in-memory representation of the displayed content related to the interacted-with UI elements produced by the web page as part of the checkout process, etc. This detected and recorded user checkout process can then be returned to backend service platform 135 and used by the platform to enhance data in, for example, seller database 104 and seller product purchase database 110. The enhanced data can then be used to simulate purchase/checkout processes on a particular seller website by imitating a regular user completing a purchase. This permits automated onboarding of merchants to the platform without the need for sellers to sign up for the proxy transaction service.

At step 206, the client module can then query product database 102 to see if the product information corresponds to a UPI in the platform and, if appropriate, update the platform databases. The UPI mapping service initially receives this query with one or more identifiers, and corresponding identifier types (i.e., ASIN, UPC, Product Name, etc.). The UPI mapping service can use the following algorithm to attempt to map the identifier to a UPI: Query product database 102 for the provided identifiers and identifier types; if a match is found, check to see if any of the fields of the returned match are blank and match identifiers provided in the query; if so, update the entry to include the additional identifiers/types present in the query; and return the UPI from the entry returned by the query. If no results are found through the query and if at least one identifier type is a machine-readable code such as an ASIN or UPC code, then the UPI mapping service can create a new entry in product database 102 including the identifiers and identifier types along with a newly generated UPI for the entry and the service can return the new UPI as a response to the query.

If the result of the query of step 206 is such that a UPI cannot be ascertained, the process can return to step 202 to begin looking for other product identifying information. If the result of the query in step 206 is that the product is recognized as supported by the platform, the process continues to step 208 where purchase options are determined based on queries to seller database 104, seller-product mapping database(s) 106, and seller product inventory device 108.

As one example of step 206, a product option service executing on backend service platform 135 receives a query with a UniqueProductIdentifier (UPI) or other product identifying information parsed from the web page. The process looks for the identifier in product database 102 to determine whether the product is supported by the platform. If there was no corresponding product in product database 102 then the product options service returns an empty response. If there is a corresponding product in product database 102 then seller-product mapping database 106 is queried with the UPI returned from the previous query. If there were no corresponding SellerProductProfile data structures in seller-product mapping database 106, then the product option service returns an empty response. If there is at least one SellerProductProfile data structure returned, then these SellerProductProfile data structures are returned to the caller of the service.

After returning a nonzero number of SellerProductProfile data structures, a product option service can use the SellerInventoryQuery functions returned from seller product inventory database 108 to update the platform data relating to seller inventory and pricing by updating values in seller product inventory database 108 (for available inventory) and seller-product mapping database 106 (for available ProductVersions and the respective PricingFunction corresponding to the seller and the UPI).

The product option service can return results in two rounds: an initial round based only on information present in the existing platform databases, and a second round (likely implemented as a call-back) based on queries sent out to web sites (or other information sources) of the sellers to ensure that product availability and pricing hasn't changed (and if it has, reflecting these changes). This allows a fast initial search and ensures information correctness shortly thereafter.

At step 208, purchase options are presented to the user. The product option service attempts to acquire one or more SellerProductProfiles corresponding to the acquired UPI by calling a product option service which queries seller-product mapping database 106. If a nonzero number of SellerProductProfiles are found then they are returned, otherwise an unsuccessful response is sent. A shipping information service is used to query seller shipping database 112 for the shipping options available for a particular set of ProductQuantities (which contain ProductVersions and their associated Quantities) to a specified ShippingAddress corresponding to the buyer. Note that the shipping address can be a physical address or a virtual/digital address, such as in the delivery of software or other content online. The service receives an OrderShippingInquiry, and it queries the seller shipping database 112 for the associated ShippingFunction, which it calls with the OrderShippingInquiry, and returns the result. A tax information service is used to query seller tax database 114 for the tax pricing for a particular set of ProductQuantities (which contain ProductVersions and their associated Quantities) based on a specified ShippingAddress (which represents the address of the buyer). The service receives an OrderTaxInquiry, and it queries the seller tax database 114 to acquire a TaxFunction which it calls with the original OrderTaxInquiry and returns the result. The purchase option information returned from these multiple queries includes seller information, pricing, delivery, and the like.

At step 210, an augmented user interface is presented on client device 137 to allow the user to review the purchase option information and select products for purchase. The browsing augmentation service receives, from the browser observation service for example, product identification (and if possible, corresponding identifying information (such as name, unique identifier (UPC, ASIN, etc.), description, etc.)), the source of the content which contains reference to the product (e.g. a URL of a webpage from which the product was recognized), and, if available, the location of the product(s) in the content on the web page (e.g.: references to elements in the in-memory representation of a web page). The browsing augmentation service then receives the purchase option information collected in step 208, interacts with the type of content the product appeared in on the web page and augments the user interface on client device 137 to indicate to present the purchase option information in an augmented user interface to inform the user the availability of the product from one or more sellers through the platform ("alternative sellers"). Optionally additional information, including but not limited to the price, additional information about the seller, and the like can be presented in the augmented user interface.

Figure 3A:
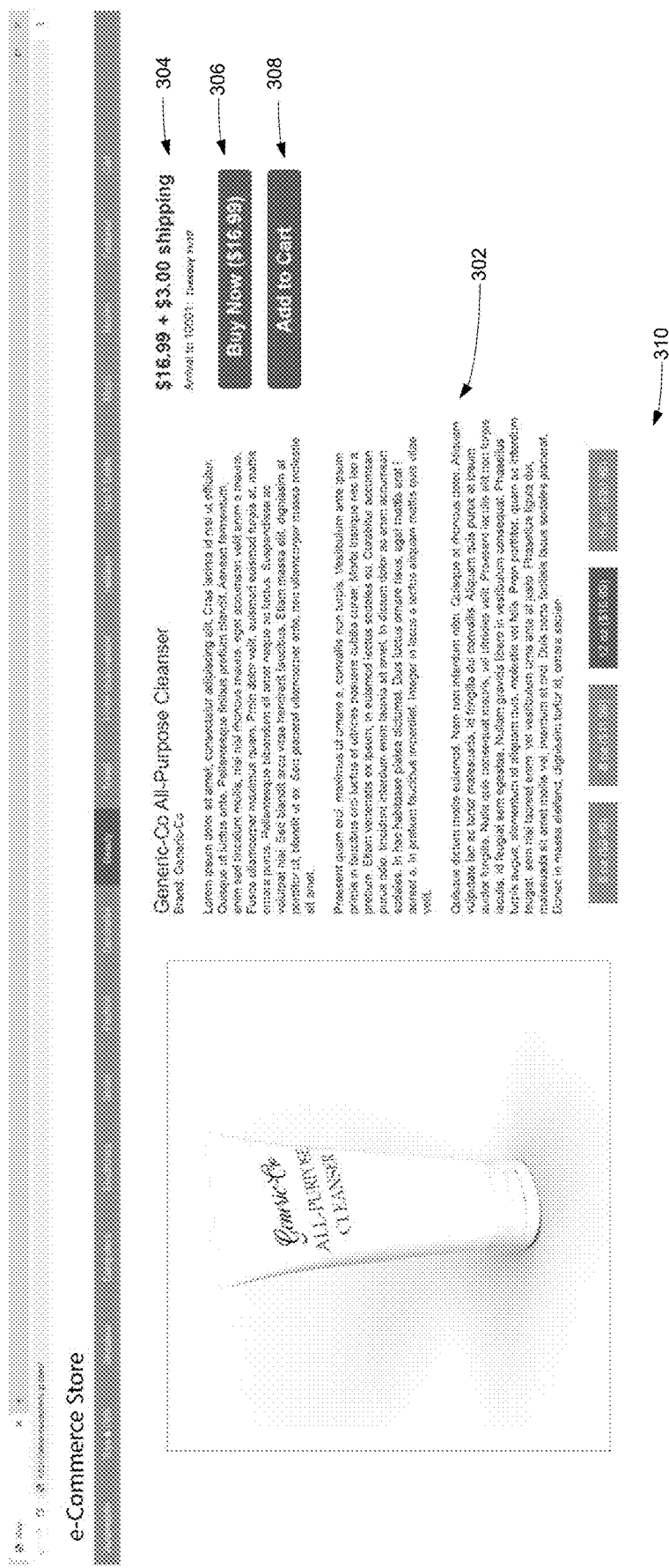
FIG. 3a illustrates a user interface of a typical web page for purchasing a product.

The augmented user interface can include UI elements in some manner (e.g. an overlay, or modifying the in-memory version of a web page to change how it is displayed and/or operates) which allow users to perform functions which may include, but are not limited to, seeing items in a cart stored by an optional service, indicating that the platform proxy service is active, and allowing the user to log in and manage their account managed by an optional additional service. FIG. 3a shows an example of a web page, as rendered on a user device, of fictitious seller "e-Commerce Store" having a conventional web page UI for presenting product information and purchase capability to a user. The UI of FIG. 3a includes product description 302, pricing and shipping information 304, Buy Now button 306, Add to Cart button 308 and product size/variation selection buttons 310. These UI elements have conventional functions for effecting a purchase on the web site of e-Commerce Store and thus are not described in detail herein.

Figure 3B:
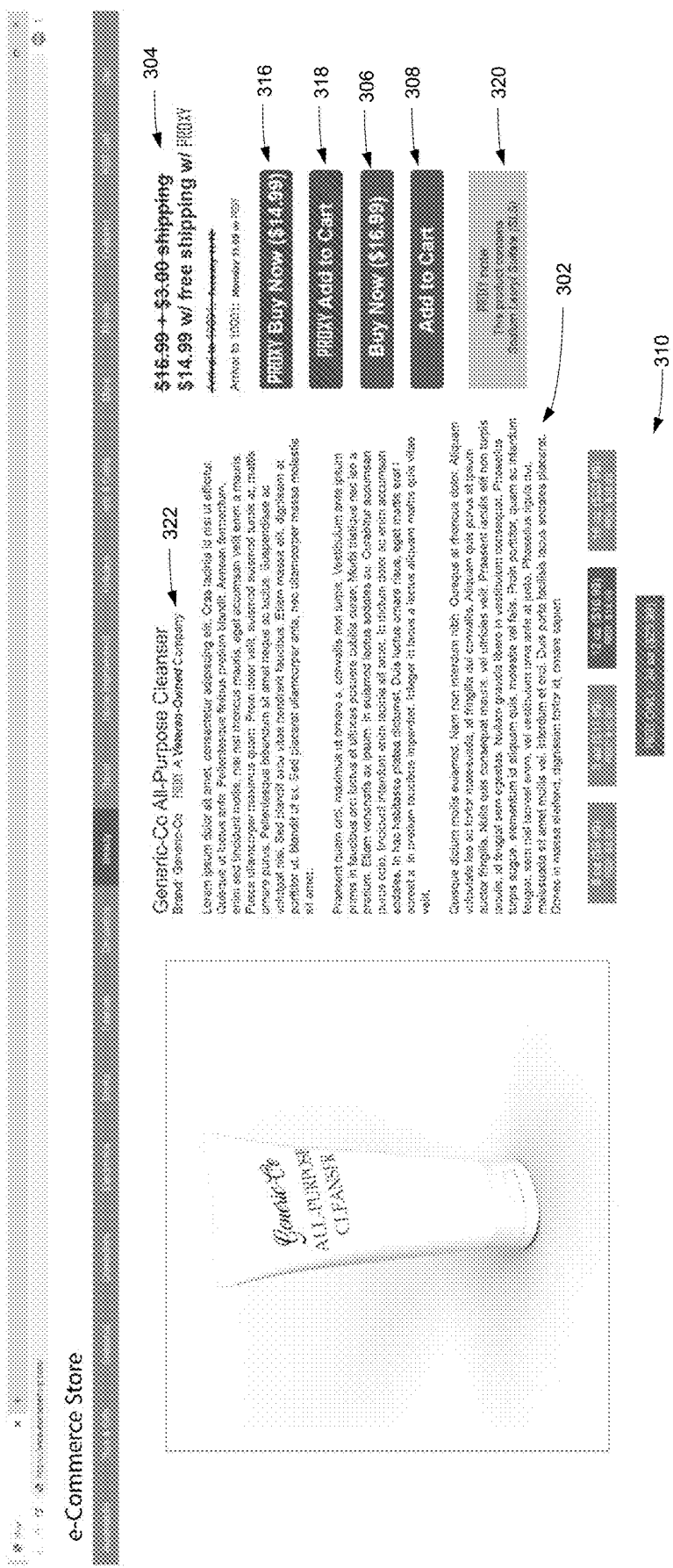
FIG. 3b illustrates the user interface of FIG. 3a augmented with an additional user interface in accordance with disclosed implementations.

FIG. 3b shows an example of an augmented UI in accordance with disclosed embodiments. The augmented UI include additional elements that assist the user in making a more informed purchase decision and which provide additional options to the user. In this example, the additional UI elements of the augmented UI include proxy Buy Now button 316 and proxy Add to Cart button 318 which respectively cause execution of a buy function and an add to cart function, through the platform, from a seller that is not necessarily the seller e-Commerce Store. Note that the additional UI elements are superimposed on and/or embedded in the web page of e-Commerce Store by the browsing augmentation service.

For each product included in information rendered on a client device, such as "General-Co All Purpose Cleaner" in this example, the browser augmentation service attempts to determine whether the content is content for which the platform is configured to interact with (e.g., the service implemented as part of a browser plugin may be able to interact with some pages of some websites based on modifying known or otherwise findable portions of the in-memory representation of the displayed website). If at least one SellerProductProfile was acquired in step 208, the browsing augmentation service follows its configured algorithm to display information about the alternate seller(s) along with any additional information it is configured to show with its augmentation strategy. For example, the elements can be customized for particular website(s) with a particular format of page detected by analyzing the URL and/or analyzing the in-memory representation of the web page and looking for elements which match a particular pattern. The interactions defined by the construction of the UI elements result in calls to a browsing interaction service which may perform tasks like adding an item to a shopping cart or attempting to purchase an item (or cart of items) as described below with respect to step 212.

In the Example of FIG. 3b, the information about the alternate seller(s) and additional information includes proxy Buy Now button 316 and proxy Add to Cart button 318. Proxy Buy Now button 316 causes execution of the proxy purchase service described below. Proxy Add to Cart button 318 cause execution of the global shopping cart service described below. Also, in this example, the additional information includes information about an alternative vendor at 322 ("Veteran-Owned" in this example) and enhancements to price and shipping information 304 and size/variation selection buttons 310 to reflect information corresponding to purchase options through the proxy system. In this example, enhancements to price and shipping information 304 show the user that the product can be purchased for $2.00 less and with free and faster shipping if the platform proxy purchase is used. Also, in this example, enhancements to size/variation selection buttons 310 indicate that there are variations (24 oz. size in this example) that are not available through the web page but are available through the platform.

In step 212, an order for one or more products can be assembled and executed. The browsing interaction service can receive interactions from users through UI elements generated either by itself or by the browsing augmentation service. For example, the browsing interaction service can respond to an interaction with a UI element (such as proxy Buy Button 316) generated by the browsing augmentation service which is used to indicate a user's intention to purchase an item through the platform and to collect information from the various databases, transmit information necessary to complete the order, and display the result of executing the order. As an example, the functionality of the browsing interaction service can include:

- Detecting or otherwise being made aware of a user's intention to purchase a product through the platform, such as through user selection of a "Buy" button displayed in the augmented UI;
- Retrieving at least one SellerProductProfile, from seller database 104, corresponding to a seller who sells the product (in a particular configuration/version represented to the user to which they responded affirmatively, if applicable);
- Retrieving, from seller shipping database 112, the available shipping options and, from seller tax database 114, the tax that will be charged on items in the order;
- Ensuring that at least one shipping option is available (otherwise, exiting the current execution loop);
- Selecting at least one shipping option (this selection could be driven by the user or could be a default, cheapest, fastest, option for example)
- Generating one or more SellerProductOrder data structures, based on relevant data from the databases, as necessary to cover all of the products the user indicated a desire to purchase;
- Presenting the user with a confirmation of the selected shipping method, total tax, and some representation of the items in the order in the augmented interface or though another mechanism such as email;
- Collecting from the user, by means of reading existing stored data in the databases (or if an account system is used, verifying that the account contains the required data) and/or providing a mechanism by which the user can input at least the minimal data required for execution of the order, including: a UBI which identifies the buyer (which in the case of account-less purchasing can be a random UBI), the DeliveryAddress the user wants the product delivered to (can be virtual or physical, and can be empty if the purchase has no delivery, such as a donation), and the PaymentMethod the user wants to use for payment;
- Calling a proxy purchase service with a OrderIntention assembled from the collected and assembled data (for example, a data structure including UBI, SellerProductOrder, DeliveryAddress, PaymentMethod); and
- Receiving an Order from the proxy purchase service, and optionally displaying to the user some indication of success or failure (which could include the total amount paid, items ordered, tracking information, etc.).

Users purchasing from the platform using the proxy purchase system will be able to select from amongst one or more sellers (of the sellers supported by the platform) for purchase of particular items. As noted above, any information relating to the seller, such as whether the seller is Veteran-owned or a small business, can be displayed in the augmented UI to facilitate seller selection by the user. When a user submits an order, a proxy purchase process receives a request with an OrderIntention which contains a unique identifier of the buyer, one or more SellerProductOrders which indicate desired item and quantity from a particular seller at an expected per-unit cost, a DeliveryAddress (physical or virtual), and a PaymentMethod which the buyer wishes to use for the purchase.

The proxy purchase service can include functionality to ensure that, for each SellerProductOrder data structure:
  The UPI exists in the platform (through a query to product database 102):
  The USI exists in the platform (through a query to seller database 104);
  The seller sells the particular UPI (through a query to seller-product mapping database 106);
  The seller has sufficient quantity in stock at the price anticipated by the SellerProductOrder (through a query to seller product inventory database 108).

If at least one product does not meet the above requirements, the proxy purchase service can return an error message indicating the product(s) which encountered issues, and the issues encountered (e.g. price has changed from $10.03 to $11.25). Otherwise, if temporary holds are supported by the PaymentMethod, place a temporary hold on the sum of funds required to complete the full anticipated order on the PaymentMethod provided. If temporary holds are not supported by the PaymentMethod, then the payment can be charged/received in full. Note that if the proxy purchase service may charge a service fee that can be included in the sum of funds required to complete the full anticipated order, which would be added to the amount held or charged.

The order execution of step 212 can include, for each USI defining a non-empty group of SellerProductOrders:
  Querying seller product purchase database 110 to acquire the seller's SellerPurchaseFunction;
  Executing the SellerPurchaseFunction for all SellerProductOrders in the group;
  Storing the returned StoreOrderResult;
  Stop iterating through the groups of SellerProductOrders if the StoreOrderResult has a non-zero number of ProductOrders in its FailedItems list;
  Create, and store in buyer history database 118, an order from all of the StoreOrderResults and the UBI, DeliveryAddress, and PaymentMethod provided in the OrderIntention;
  If temporary holds were supported on the PaymentMethod and used above, convert the temporary hold into a charge for the sum of funds required for all successfully completed purchases, and the service fee charged by the proxy purchase service if applicable; and
  If temporary holds were not supported on the PaymentMethod and full payment was collected above, then refund the difference between the charged amount and the amount required for all successfully completed purchases, and the additional service fee, if applicable.

The seller(s) can then fulfill and ship the items in the order(s) in a conventional manner. Of course, automated alerts and notices can be sent to the purchaser upon various events, such as shipping, delivery, delays, and the like.

A product voting service allows users to vote for items on popular eCommerce or other web sites to be added to the platform. The voting process itself does not necessarily trigger any automatic or manual onboarding process but can record user votes for particular products/vendors. For example, when a user is on a product page of an eCommerce site, the client module can check to see if the product they are viewing is supported by the platform, in the manner described with response to steps 202, 204, and 206 of FIG. 2 for example. If the product is not supported, a button which allows the user to vote for that product (along with a counter of existing votes) can be presented in the augmented UI. Clicking this button will send a vote to the product voting service which will record the vote.

The product voting Service can be called whenever a user clicks on the "vote" button on a product page they're viewing, or by other actions. The product voting service can be called with a UniqueBuyerIdentifier (UBI) along with the UniqueProductIdentifier (UPI) which was voted for, and any other appropriate parameters. Upon receiving a vote, the product voting service can record the vote in product voting database 122 (by incrementing the total number of votes or creating a new entry with 1 vote if no entry matching the UPI exists).

The various databases described above can be created in various conventional manners. Disclosed implementations create the databases by combining, processing, and enhancing existing data from multiple distributed data sources. For example, a seller scraping service can crawl the internet looking for eCommerce sites that sell a particular product and are a potential candidate for automatically onboarding onto the platform (possibly based on data in product voting database 122). The platform can offer a product in, for example, two different ways: 1) by having a seller onboard themselves onto the platform through a registration process providing the platform with access to the backend of their eCommerce site (ex: with a jailed API key only capable of creating orders) which sells a particular product; or 2) by automatically onboarding eCommerce stores that sell the particular product, and interacting with them by simulating a user in the manner described above.

Many different variations of seller scraping services are possible. In one disclosed implementation the seller scraping service will initially use online search engines (such as Google™ and Duckduckgo™) to search for products that the platform supports or intends to support. The general flow of this implementation of the seller scraping service can be as follows:
  The service is initialized with a ProductVersion and a String product name, optionally along with additional information (UPC code, ASIN code, manufacturer, country of origin, etc.);
  The service performs one or more search queries on the search engine(s) it is configured to use based on combinations of the String product name, the version(s) of the product specified by the ProductVersion, and the additional information (if provided);
  For each search query result, the service can acquire a copy of a part of (potentially some subset of, based on criteria which may include but is not necessarily limited to search ranking, site reputation as provided by a multitude of online sources including but not limited to third-party review websites, and number of matching keywords in site description) each linked result webpage and attempts to detect whether the website is a supported format (ex: uses a specific type of structure or has elements which match specific patterns, or uses a known eCommerce site format e.g. Wordpress™ with the WooCommerce™ plugin). This detection involves looking for specific keywords in the webpage's HTML and trying to access certain URLs on the website in a known manner.
  For each webpage which follows a supported format, the service will attempt to navigate to the store root directory (for example, domain.com/shop, or through attempting to find a link in the webpage to the store root page which lists products), and (if required, interacting with the pagination function of the store) scrape some or all products supported by the store. If the store is already supported by the platform, it's existing USI will be acquired from seller database 104, otherwise a new one will be generated. All of the scraped products will be stored in the product cache database 124 with the USI, the product name, a URL link to the product page, and any other additional information available about the product (such as pricing and the like);

If any of the scraped products match the string product name (or meet some matching criteria based on similarity, such as threshold Hamming distance), then all of the relevant information will be stored in the onboarding queue database 126, including the type of store that is currently being browsed.

The platform can also provide a global shopping cart service through the browsing interaction service. As users browse the web or otherwise are presented content by software running on their computer and the browsing observation service detects that the content presented to the user contains information relating to one or more products, as described above, the browsing interaction service may provide the ability to create, maintain, and check out with a virtual "shopping cart" of items. A global shopping cart service allows users to add items to their global cart from any site or other displayed content which contains products detectable by the browsing observation service, switch between carts, remove items from their cart, and eventually check out with some or all items in one or more carts, which may be sold by a multitude of different retailers.

Figure 3C:
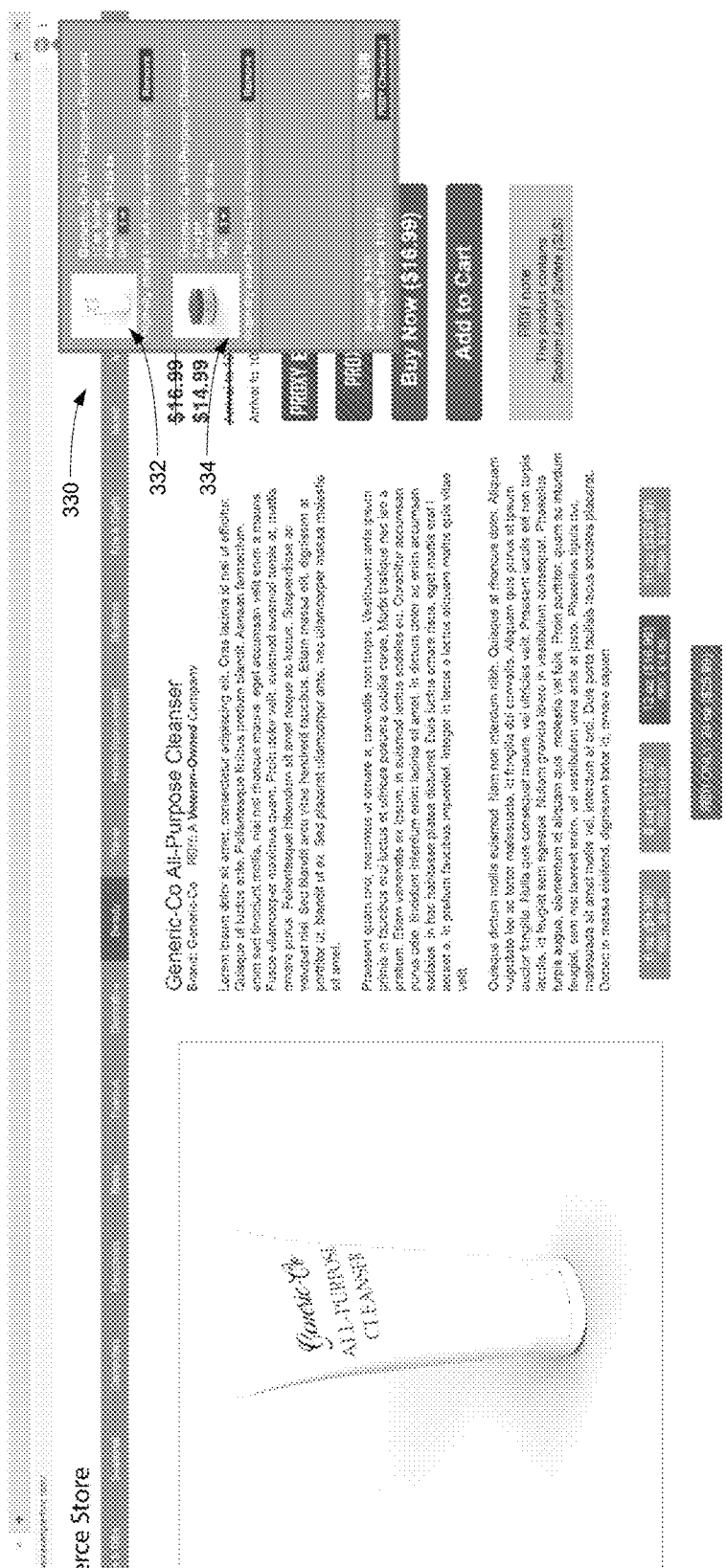
FIG. 3c illustrates the user interface of FIG. 3a augmented with an additional user interface showing global shopping cart information in accordance with disclosed implementations.

For example, as illustrated in FIG. 3c, the additional UI elements generated by browsing augmentation service can include shopping cart window 330 implemented as a popup window. Note that, in this example, shopping cart window shows that the user has selected two products to be placed in a shopping cart. Product 332 is from seller Exampleshop.com and product 334 is from seller ebeautystore.com. In other words, the global shopping cart integrates selections from multiple vendors into a single shopping experience for the user. Other elements of FIG. 3c are similar to elements of FIG. 3b.

The Global Shopping Cart Service can provide the following functionality:

On receiving a CreateCartRequest, creating an entry in user shopping cart database 128 which corresponds to the provided name and the one or more UBIs associated with the cart;

On receiving a AddToCartRequest, updating an entry in the user shopping cart database 128 if there is a cart matching the request's CartId adding the provided ProductQuantity (if valid) to the cart;

On receiving a RemoveFromCartRequest, updating an entry in the user shopping cart database 128 if there is a cart matching the request's CartId and there is a matching ProductQuantity existing in the specified cart; and On receiving a GetCartRequest, returning the associated cart (if present) from the user shopping cart database 128 with the CartId corresponding to the CartId specified in the request. The checkout process using a cart can follow the same pattern described earlier for the user purchase flow.

Reputation can play a large role in crowdsourced data applications. Users can report information to the platform which affects the quality of operation of the platform services. Therefore, the platform maintains reputation information for customers for use in weighting their reported information. A reputation calculation service queries reputation database 130 for one or more ReputationEntry data structures which are used to calculate a reputation for a particular UBI (i.e. a customer). A ReputationEntry has a local accuracy and weight assigned to it at the time of creation. Additionally, the reputation calculation service orders all instances of ReputationEntry from oldest to most recent to provide additional weighting which favors recent instances for the calculation of the reputation of a UBI. The reputation calculation service can use ReputationEntry data structures to increase or decrease an initial starting reputation to calculate an up-to-date reputation corresponding to a particular UBI.

To find initial or additional sources for products, a crowdsourced product locating service collects potential product locations (and their accompanying location and related data including but not limited to name, description, and associated multimedia or URLs thereof) sent by users of the platform (and/or automatically sent in by client modules without their interaction), dispatches requests for users of the platform to verify matches, and can update platform users' reputations and/or provide consideration to users for their help (through discounts, coupons, tokens, points, and the like).

As described above, the browsing observation service automatically attempts to detect products (and their associated data including but not limited to price, name, description, and/or associated multimedia). These potential product findings can be sent to a crowdsourced product Locating Service. When a client module sends a ProductFound message to the crowdsourced product locating service, the service will attempt to match the ProductFound with a UPI by querying the UPI mapping service (described above) for a match. If a match is not found, the UPI mapping service will create a new UPI corresponding to the ProductFound in the manner described above.

The crowdsourced product locating service then creates a ProductToFind based off of the data contained in ProductFound. Note that multiple ProductToFinds can exist with the same QPI but contain different information about the product (ex: same product on two different websites with two different descriptions). If the constructed ProductFound is not an exact duplicate to an existing entry in product matching database 132, the ProductFound will be inserted into the product matching database 132.

As the browsing observation service executed on a user module detects products that a user browses and sends product information to the crowdsourced product locating service (and a UPI is acquired by the portion of the crowdsourced product locating service that handles incoming initial ProductFound messages), the crowdsourced product locating service will query product matching database 132 for existing matches. If one or more matches exist, one or more of the matches may have a corresponding ProductVerifyRequest constructed based on of the ProductFound and matching ProductToFind data structures found in the product matching database 132. The ProductVerifyRequest can be sent to the client module of the client device 137 that sent the ProductFound message. If the client replies with a ProductVerifyResponse, then the response is added to the product matching database 132 and marked as Tentative.

At a predetermined interval, the crowdsourced product locating service evaluates Tentative entries in the product matching database 132 to determine the quality of the found matches based off of the corresponding ProductVerifyResponses. Once a sufficient threshold number of ProductVerifyResponses (e.g 10) are collected (and/or a sufficient weight of ProductVerifyResponses based on the reputation of their corresponding UBIs as calculated by the reputation calculation service is reached (e.g. 100), the responses are evaluated by processing the weighting of each ProductVerifyResponse based off of the reputation of the corresponding UBI as calculated by the reputation calculation service. The sum of all reputations corresponding to positive (success=true) ProductVerifyResponses is divided by the sum of all reputations corresponding to all ProductVerifyResponses to calculate a certainty ratio. If the certainty ratio is below a certain threshold (e.g. 0.20) then the match between the ProductToFind and ProductFound is determined incorrect. Positive reputation events are entered into reputation database 130 for all UBIs corresponding to negative ProductVerifyResponses, and negative reputation events are entered into the reputation database 130 for all UBIs corresponding to positive ProductVerifyResponses. If the certainty ratio is above a certain threshold (e.g. 0.80) then the match between the ProductToFind and ProductFound is determined correct. Positive reputation events are entered into reputation database 130 for all UBIs corresponding to positive ProductVerifyResponses, and negative reputation events are entered into reputation database 130 for all UBIs corresponding to negative ProductVerifyResponses. If the certainty ratio is between the thresholds, no action is taken.

If a positive or negative match was determined, then all Tentative designations of corresponding entries in the matched product database 132 are removed. If a negative match was determined, then the corresponding entry is designated as Failed.

The crowdsourced product locating service can instruct a consideration providing service to send consideration to UBIs corresponding to the result that matched the determination of whether the ProductToFind and ProductFound matched. The consideration providing service is configured to provide consideration to users identified by their UBIs by sending funds to a payment endpoint (such as a debit card, bank account, etc.) associated with the UBI, by sending one or more cryptocurrencies to blockchain addresses associated with the UBI, and/or by crediting an account associated with the UBI with coupons, discounts, tokens, and/or credits.

As described above, the platform can leverage user actions to learn about products and sellers. The browsing observation service can, for example, record user interactions with web pages and other content through two different mechanisms: 1) automatically recording interactions with certain web page elements and/or other detected UI elements, and/or 2) prompting users to identify fields, validation mechanisms and patterns, etc. When these user interactions are recorded and returned to the crowdsourced website interaction service, they can be mapped into a SellerPurchaseFunction, or optionally other functions.

The browsing observation service can identify when the user is browsing a website of interest to the platform by sending a BrowseNotification to the browsing interaction service with the current URL (or a derivative thereof), and upon receiving a positive indication through an InteractionRecordRequest, observe the order in which the user interacts with fields identified by the patterns in the Fields section of the InteractionRecordRequest, observe their input and sanitize it (e.g. observing whether a phone number is entered with a country code and whether dashes/parenthesis are used), and produce corresponding UIInteractions data structures.

The browsing augmentation service can prompt the user to either confirm that a detected field indeed matches a particular tag/description/pattern, and/or to confirm that the format of an entered piece of data follows an understood format. Additionally, the browsing augmentation service could prompt users to identify or find fields that the service did not find or confirm their lack of existence.

Once one of the FinalizationFields data structures has been interacted with, the browsing augmentation service will take all ordered recorded and produced UIInteractions and produce an InteractionProcess data structure which is returned to the browsing interaction service. If user interaction was used in any part of the process, the corresponding UIInteractions data structure will indicate this with the HumanGenerated field.

The browsing interaction service can receive an InteractionProcess from a client device 137, and map the elements of the InteractionProcess to a SellerPurchaseFunction or some other function by synthesizing code or otherwise generating instructions which can be executed which can load a particular webpage and reproduce the same interactions (with different inputs, e.g. addresses, payment info, etc.).

When the browsing interaction service receives a BrowseNotification from the client module executing on a client device 137, the service will query interactions database 134 to see if there is a match (potentially using a pattern matching such as filtering out some parts of the URL that are dynamic, etc.). When a client responds with a InteractionProcess that demonstrates how to interact with a website, the crowdsourced website interaction service will store a corresponding InteractionProcess data structure in interactions database 134.

Periodically, the crowdsourced website interaction service will query interactions database 134 and, if there are enough entries in the interactions database then it will compare the InteractionProcesses for similarity to determine if there is a probably successful interaction strategy that can by synthesized (built from the dominant InteractionProcesses chosen by comparison). Alternatively, another metric could be used, especially when human interaction was involved in creating the InteractionProcesses. For example, a total sum of reputations of the UBIs who caused the InteractionProcesses to be created could be used as the condition for triggering the comparison.

The analysis can include comparing the UIInteractions (and their order) of each InteractionProcess with others. In many cases, a template of interactions will define stages of the interaction, which fields are likely needed or not needed, and whether the order of specific interactions in a stage is relevant. For example, a checkout template of interactions could define stages of entering shipping information, entering billing information, and submitting the order. Each stage would have fields that it assumes are necessary (first and last name, address line 1, state/providence, zip, country), fields that may be present but are likely unnecessary or only necessary in some scenarios (address line 2, suffix/prefix), and whether the order of entry matters (ex: address information can be entered in any order).

If many of the InteractionProcesses maintain significant similarity with each other but do not adhere to the expected flow of a template for the targeted interaction process (e.g. a checkout process), then some or all (depending on configuration and exact versus similar matching of the InteractionProcesses) will be added to the interactions database 134 with a flag indicating that they do not follow the expected flow of the corresponding template. As noted above, the threshold number can be defined by a configuration threshold which may be dependent on a total number and/or on a total reputation weight and/or a reputation ratio to dissenting opinion. Interactions database 134, can be manually reviewed to determine whether the URL is a location at which a user could properly execute the intended process (ex: checkout) and/or whether the interaction process(es) which were significantly similar with each other do in fact detail a valid interaction pattern with the webpage despite being non-standard.

If a threshold number of interactions adhere to the expected process template, then depending on configuration, the service can either synthesize a SellerPurchaseFunction or other function (ShippingFunction, TaxFunction, etc.) and add it to the respective database for immediate use, or can place the URL and the matching InteractionProcesses into interactions database 134 for manual review or similar before conversion/synthesis into a function usable by other services of backend service platform 135. The threshold number can be defined by a configuration threshold which may be dependent on a total number and/or on a total reputation weight and/or a reputation ratio to dissenting opinion.

The reputation calculation service can be configured to update reputation scores based on results update reputation database 130 with positive entries corresponding to returned InteractionProcess UBIs that were similar enough to each other and matched the expected process template, and negative entries corresponding to the non-matching InteractionProcess UBIs.

Figure 4:
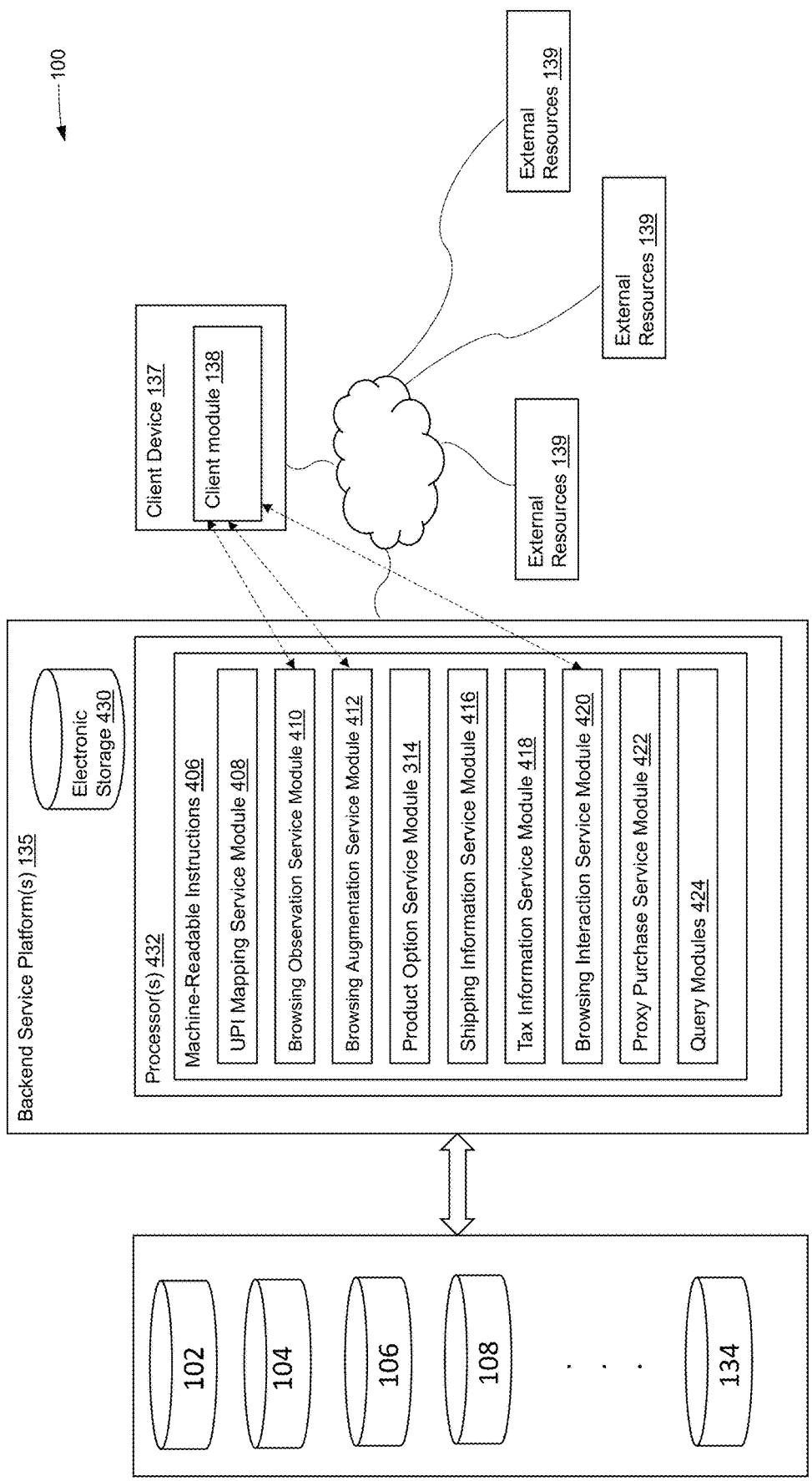
FIG. 4 is a schematic diagram of a computing system for proxy transactions in accordance with disclosed implementations, with the backend service shown in detail.

FIG. 4 illustrates the computing system 100 of FIG. 1 with backend service platform 135 shown in more detail. Backend service platform 135 can include one or more servers configured to communicate with one or more remote computing platforms, such as client device(s) 137 and external resource(s) 139 (such as vendor computing platforms). Communication can be in accordance with a client/server architecture and/or other architectures. Backend service platform 135 can be configured by machine-readable instructions 406 which may include the services described above in the form of computer software modules stored in electronic storage 430 and executing on processor(s) 432. The software modules may include one or more of UPI mapping service module 408, browsing observation service module 410, browsing augmentation service module 412, product options service module 414, shipping information service module 418, tax information service module 418, browsing interaction service module 420, proxy purchase service module 422, and query modules 424 to accomplish queries and other services described herein.

Client device(s) 137 may include one or more processors configured to execute client-side computer program modules of client module 138. Client-side computer program modules can include a portion, or the entirety, of any of the modules shown as executing in backend service platform 135. For example, browsing observation service module 410 and browsing augmentation service module 412 can execute, at least in part, on client device 137. The modules may be configured to enable a user associated with the given client device 137 to interface with backend service 135 and databases 102 to 134, and/or provide other functionality attributed herein to client device 137. By way of non-limiting example, the client computing platform(s) 137 may include one or more of a desktop computer, a laptop computer, a handheld computer, a tablet computing platform, a NetBook, a Smartphone, a gaming console, and/or other computing platforms.

External resources 139 may include sources of information outside of system 100, such as seller systems containing product information and other relevant information. external entities participating with system 100, and/or other resources. Backend service platform 135 may include a plurality of hardware, software, and/or firmware components operating together to provide the functionality described herein. For example, server(s) of backend computing platform may be implemented by a cloud of computing platforms operating together. Electronic storage 430 may comprise non-transitory storage media that electronically stores information. The electronic storage media of electronic storage 130 may include one or both of system storage that is provided integrally and/or removable storage that is removably connectable to servers of backend service platform via, for example, a port (e.g., a USB port, a firewire port, etc.) or a drive (e.g., a disk drive, etc.). Electronic storage 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 430 may include one or more virtual storage resources (e.g., cloud storage, a virtual private network, and/or other virtual storage resources). Electronic storage 430 may store software algorithms, information determined by processor(s) 432, information received from client device(s) 137, and/or other information.

Processor(s) 432 may include one or more of a digital processor, an analog processor, a digital circuit designed to process information, an analog circuit designed to process information, a state machine, and/or other mechanisms for electronically processing information. Although processor(s) 432 is shown in FIG. 4 as a single entity, this is for illustrative purposes only. In some implementations, processor(s) 432 may include a plurality of processing units. These processing units may be physically located within the same device, or processor(s) 432 may represent processing functionality of a plurality of devices operating in coordination. Processor(s) 432 may be configured to execute the modules and/or other modules by software; hardware; firmware; some combination of software, hardware, and/or firmware; and/or other mechanisms for configuring processing capabilities on processor(s) 432. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules may be illustrated as being implemented within a single processing unit one or more of the modules may be implemented remotely from the other modules. The description of the functionality provided by the different modules is for illustrative purposes, and is not intended to be limiting, as any of the modules may provide more or less functionality than is described. For example, one or more of modules may be eliminated, and some or all of its functionality may be provided by other ones of the modules.

The various examples of functional logic noted herein can may be implemented in an electronic device to produce a special purpose computing system. Computer-implemented steps of the methods noted herein can comprise a set of instructions stored on a computer-readable medium that when executed cause the computing system to perform the steps. A computer-readable medium, as used herein, refers only to non-transitory media, does not encompass transitory forms of signal transmission, and expressly excludes paper.

A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. Claims directed to methods herein are expressly limited to computer implemented embodiments thereof and expressly do not cover embodiments that can be performed purely mentally. The absence of the term "means" from any claim should be understood as excluding that claim from being interpreted under Section 112(f) of the Patent Laws. As used in the claims of this application, "configured to" and "configured for" are not intended to invoke Section 112(f) of the Patent Laws.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A distributed computing system for accomplishing a transaction through a proxy system, the system comprising:
   a product database, stored on a computing device and including multiple product records, each product record corresponding to one of plural items and including a unique product identifier that is machine-readable, a human-readable product name, and item attribute data indicating characteristics of a corresponding item;
   a supplier database, stored on a computing device and including multiple supplier records, each supplier record corresponding to one of plural item suppliers and including a machine-readable unique item supplier identifier, a human-readable item supplier name and item supplier attributes indicating characteristics of a corresponding item supplier;
   a supplier-product mapping database, stored on a computing device and including multiple mapping records, each mapping record corresponding to one of the unique item identifiers and including an item supplier product profile specifying at least one version of one of the items and at least one of the suppliers who is able to supply the at least one version of the item;
   a customer profile database, stored on a computing device and including plural customer profile records, each customer profile record corresponding to a customer and including a unique customer identifier, a delivery address corresponding to the unique customer, payment information corresponding to the unique customer and contact information corresponding to the unique customer;
   a supplier query module configured to query the supplier-product mapping database to thereby determine at least one supplier of the item;
   a product query module configured to query the product database to thereby determine attributes of the item of interest;
   a client module including a client-side component configured to execute on a client device associated with at least one of the customers, the client module including:
     a browsing observation service module configured to recognize an item of interest to a corresponding customer based on content being displayed on the client device and correlate a unique item identifier with the item of interest; and
     a browsing augmentation service module configured to present an additional user interface on the client device, which augments a user interface of the content, when the client device is viewing the content, the additional user interface including at least one attribute of the item of interest returned from the product database and at least one supplier of the item of interest returned from the supplier-product mapping database, the user interface including a purchase selection element; and
   a proxy purchase service module configured to execute a purchase function for the item of interest from the at least one item supplier in response to a user selection of the purchase element and in accordance with a record corresponding the customer in the customer profile database.

2. The system of claim 1, wherein the additional user interface further includes an attribute selection element for retrieving further product attributes from the product database.

3. The system of claim 1, further comprising:
   a supplier item inventory database, stored on a computing device and including multiple records, each record corresponding to a unique triple of one of the unique product identifiers, one of the unique item supplier identifiers, and one of the versions of the item; and
   a supplier inventory query module configured to query an external supplier platform for updated inventory for a particular version of an item;
   wherein the supplier query module is further configured to query the supplier item inventory database to determine at least one supplier of the item.

4. The system of claim 1, wherein the records in the supplier product mapping database further include pricing functions that are used to determine supplier-specific pricing for items.

5. The system of claim 1, further comprising:
   a user shopping cart database and a browsing interaction service module;
   wherein the browsing interaction service module is configured to:
     receive a create request to create a cart and, in response to the create request, create a record in the user shopping cart database which corresponds to one or more customers associated with the cart, the record including a cart ID;
     receive an add request including a cart ID and, in response to the add request update a matching record in the user shopping cart database by adding an item and quantity of the item to the matching record;
     receive a remove request including a cart ID and, in response to the remove request update a matching record in the user shopping cart database by removing an item and quantity of the item to the matching record;
     receive a get cart request including a cart ID and, in response to the get cart request, return the record from the user shopping cart database with the cart ID corresponding to the cart ID specified in the get request.

6. The system of claim 5, wherein there are multiple add requests corresponding to multiple items from different suppliers.

7. The system of claim 1, wherein the browsing observation service module is configured to detect specific user interface elements of the content that indicate a purchase process, record user interaction with the specific interface elements during the purchase process, and return user interaction data to the supplier database, whereby supplier data can be automatically enhanced to allow the supplier to participate as a supplier in the system without the need for the supplier to register with the system.

8. The system of claim 7, wherein the browsing observation service module is configured to detect and record at least one of fields in the content that are filled in and a format of the data in the fields, which buttons are selected in the content, which keystrokes are used to navigate the content, and corresponding information available in the in-memory representation of the content related to the interacted-with UI elements produced as part of the purchase process.

9. The system of claim 8, wherein the browsing augmentation service module is configured to present user interface elements to prompt the user for information which can be used to enhance data.

10. A method for accomplishing a transaction over a distributed computing system using a proxy system, the proxy system including a product database, stored on a computing device and including multiple product records, each product record corresponding to one of plural items and including a unique product identifier that is machine-readable, a human-readable product name, and item attribute data indicating characteristics of a corresponding item; a supplier database, stored on a computing device and including multiple supplier records, each supplier record corresponding to one of plural item suppliers and including a machine-readable unique item supplier identifier, a human-readable item supplier name and item supplier attributes indicating characteristics of a corresponding item supplier; a supplier-product mapping database, stored on a computing device and including multiple mapping records, each mapping record corresponding to one of the unique item identifiers and including an item supplier product profile specifying at least one version of one of the items and at least one of the suppliers who is able to supply the at least one version of the item; a customer profile database, stored on a computing device and including plural customer profile records, each customer profile record corresponding to a customer and including a unique customer identifier, a delivery address corresponding to the unique customer, payment information corresponding to the unique customer and contact information corresponding to the unique customer; the method comprising:
querying the supplier-product mapping database to thereby determine at least one supplier of the item;
querying the product database to thereby determine attributes of the item of interest;
executing, on a client device associated with at least one of the customers, a client module including a client-side component, the executing including:
recognizing an item of interest to a corresponding customer based on content being displayed on the client device and correlating a unique item identifier with the item of interest; and
presenting an additional user interface on the client device, which augments a user interface of the content, when the client device is viewing the content, the additional user interface including at least one attribute of the item of interest returned from the product database and at least one supplier of the item of interest returned from the supplier-product mapping database, the user interface including a purchase selection element; and
executing a proxy purchase function for the item of interest from the at least one item supplier in response to a user selection of the purchase element and in accordance with a record corresponding the customer in the customer profile database.

11. Computer-readable media having non-transitory instructions recorded thereon for accomplishing a transaction over a distributed computing system using a proxy system, the proxy system including a product database, stored on a computing device and including multiple product records, each product record corresponding to one of plural items and including a unique product identifier that is machine-readable, a human-readable product name, and item attribute data indicating characteristics of a corresponding item; a supplier database, stored on a computing device and including multiple supplier records, each supplier record corresponding to one of plural item suppliers and including a machine-readable unique item supplier identifier, a human-readable item supplier name and item supplier attributes indicating characteristics of a corresponding item supplier; a supplier-product mapping database, stored on a computing device and including multiple mapping records, each mapping record corresponding to one of the unique item identifiers and including an item supplier product profile specifying at least one version of one of the items and at least one of the suppliers who is able to supply the at least one version of the item; a customer profile database, stored on a computing device and including plural customer profile records, each customer profile record corresponding to a customer and including a unique customer identifier, a delivery address corresponding to the unique customer, payment information corresponding to the unique customer and contact information corresponding to the unique customer; the method comprising:
querying the supplier-product mapping database to thereby determine at least one supplier of the item;
querying the product database to thereby determine attributes of the item of interest;
executing, on a client device associated with at least one of the customers, a client module including a client-side component, the executing including:
recognizing an item of interest to a corresponding customer based on content being displayed on the client device and correlating a unique item identifier with the item of interest; and
presenting an additional user interface on the client device, which augments a user interface of the content, when the client device is viewing the content, the additional user interface including at least one attribute of the item of interest returned from the product database and at least one supplier of the item of interest returned from the supplier-product mapping database, the user interface including a purchase selection element; and
executing a proxy purchase function for the item of interest from the at least one item supplier in response to a user selection of the purchase element and in accordance with a record corresponding the customer in the customer profile database.

\* \* \* \* \*